(12) United States Patent
Fang

(10) Patent No.: US 6,907,535 B2
(45) Date of Patent: Jun. 14, 2005

(54) METHOD AND DEVICE FOR ADJUSTING THE EXECUTING EFFICIENCY OF AN ELECTRONIC APPARATUS COMPRISING A CPU

(75) Inventor: Wen-Chi Fang, Hsinchu (TW)

(73) Assignee: Windbond Electronics Corp., Hsinchu (TW)

( * ) Notice: Subject to any disclaimer, the term of this patent is extended or adjusted under 35 U.S.C. 154(b) by 622 days.

(21) Appl. No.: 09/875,120

(22) Filed: Jun. 6, 2001

(65) Prior Publication Data

US 2002/0104029 A1 Aug. 1, 2002

(30) Foreign Application Priority Data

Jan. 2, 2001 (TW) ........................................ 90100054 A

(51) Int. Cl.⁷ .............................................. G06F 1/26
(52) U.S. Cl. ....................................... 713/322; 713/320
(58) Field of Search ................................ 713/300, 320, 713/322, 324

(56) References Cited

U.S. PATENT DOCUMENTS 6,076,171 A * 6/2000 Kawata ...................... 713/501
6,425,086 B1 * 7/2002 Clark et al. ................. 713/322
6,529,965 B1 * 3/2003 Thomsen et al. ............... 710/8

OTHER PUBLICATIONS

Siebler, Daniel "Re: P2B–F/P111 450—how do I overclock it", Google Groups, Sep. 17, 1999.*

Preiss, Wolfgang "Re: FIC 503+ Memory Frequencies", Google Groups, Nov. 27, 1999.*

* cited by examiner

Primary Examiner—Lynne H. Browne
Assistant Examiner—Paul Yanchus, III
(74) Attorney, Agent, or Firm—Volpe and Koenig, P.C.

(57) ABSTRACT

A method for adjusting an executing efficiency adapted in an electronic apparatus, wherein the electronic apparatus has a central processing unit (CPU) and uses an operating system to manage data. The method includes steps of obtaining a loading value when the operating system is executed to detect the CPU under the electronic apparatus operation, and adjusting a working frequency and a working voltage of the CPU corresponding to the loading value for achieving adjustment of the executing efficiency in the electronic apparatus.

4 Claims, 6 Drawing Sheets

METHOD AND DEVICE FOR ADJUSTING THE EXECUTING EFFICIENCY OF AN ELECTRONIC APPARATUS COMPRISING A CPU

FIELD OF THE INVENTION

The present invention relates to a method and a device for adjusting an executing efficiency, and more particularly to a method and a device applied in an electronic apparatus for adjusting an executing efficiency.

BACKGROUND OF THE INVENTION

Along with quickly replacement of the information products, the electronic apparatuses with a central processing unit (CPU) as a control center are quickly developed, such as personal computer, notebook, personal digital assistant (PDA) and information appliance (IA). Each of those electronic apparatuses has an operation system to play both roles of an interface between users and the electronic apparatus, and of a manager in the entirety of software and hardware.

When the electronic apparatus enters the operation system after finishing the starting procedure, the system loading will has very big difference because the program or the instruction executed is different. For example, when a personal computer is executing a complicated game program, the system loading of the personal computer is 4 or 5 times of that for executing a general document work. However, the CPU still uses unified and fixed front side BUS frequency to execute different programs and instructions. That is, the CPU uses the same executing speed to deal with different software even thought the software has different degrees in the complication. Hence, if the system mostly deals with the simple program and the system loading is lighter, the fixed executing frequency will cause whole resource-consumption, increase power consumption, and reduce use life of the electronic apparatus.

In addition, the speed step technology is developed by Intel Company to apply in a portable personal computer for detecting whether the power is provided by a power supply or a battery. Then, the CPU will be switched to higher working frequency when using the power supply and to lower working frequency when using the battery for saving the energy resource. However, the CPU still uses the same executing speed to deal with the different complicated programs.

Therefore, the purpose of the present invention is to develop a method and a device to deal with the above situations encountered in the prior art.

SUMMARY OF THE INVENTION

It is therefore an object of the present invention to propose a method and a device for adjusting an executing efficiency adapted in an electronic apparatus for reducing whole resource-consumption.

It is therefore another object of the present invention to propose a method and a device for adjusting an executing efficiency adapted in an electronic apparatus for reducing power-consumption.

It is therefore an additional object of the present invention to propose a method and a device for adjusting an executing efficiency adapted in an electronic apparatus for increasing the use life of the electronic apparatus.

According to the present invention, there is proposed a method for adjusting an executing efficiency adapted in an electronic apparatus, wherein the electronic apparatus has a central processing unit (CPU) and uses an operating system to manage data. The method includes steps of obtaining a loading value when the operating system is executed to detect the CPU under the electronic apparatus operation, and adjusting a working frequency and a working voltage of the CPU corresponding to the loading value for achieving adjustment of the executing efficiency in the electronic apparatus.

Certainly, the electronic apparatus can be a personal computer or a notebook. Preferably, the operating system is a window operating system. Preferably, the window operating system provides a file of Regedit.exe to be executed for detecting the CPU to obtain the loading value during the electronic apparatus operating.

Certainly, the method can further include steps of adjusting working frequencies of a memory circuit, an accelerated graphics port (AGP), and a peripheral component interconnect (PCI), and a working voltage of a chip set for achieving adjustment of the executing efficiency in the electronic apparatus.

Preferably, the step of adjusting the working frequency of the CPU includes steps of changing a value of a register in a timing pulse generator corresponding to the loading value, and changing a front side BUS frequency outputted from the timing pulse generator to the CPU corresponding to the value of the register change.

Preferably, the step of adjusting the working voltage of the CPU includes steps of receiving a voltage signal outputted from a voltage identification (ID) pin of the CPU, and changing the working voltage outputted from a voltage regulator IC to the CPU corresponding to the loading value and the voltage signal.

According to the present invention, there is proposed a device for adjusting an executing efficiency adapted in an electronic apparatus, wherein the electronic apparatus has a central processing unit (CPU) and uses an operating system to manage data. The device includes a reader for reading a loading value when the operating system is executed to detect the CPU under the electronic apparatus operation, and a regulator electrically connected to the reader for adjusting a working frequency and a working voltage of the CPU corresponding to the loading value for achieving adjustment of the executing efficiency in the electronic apparatus.

According to the present invention, there is proposed a method for adjusting an executing efficiency adapted in an electronic apparatus, wherein the electronic apparatus has a central processing unit (CPU). The method includes steps of obtaining a loading value by detecting the CPU under the electronic apparatus operation, and adjusting a working frequency of the CPU corresponding to the loading value for achieving adjustment of the executing efficiency in the electronic apparatus.

Certainly, the electronic apparatus can be a personal computer or a notebook. Preferably, the method further includes step of adjusting a first working voltage of the CPU and a second working voltage of a chip set in the personal computer corresponding to the loading value for achieving adjustment of the executing efficiency in the electronic apparatus.

According to the present invention, there is proposed a device for adjusting an executing efficiency adapted in an electronic apparatus, wherein the electronic apparatus has a central processing unit (CPU). The device includes a reader for reading a loading value by detecting the CPU under the electronic apparatus operation and a regulator electrically connected to the reader for adjusting a working frequency of the CPU corresponding to the loading value for achieving adjustment of the executing efficiency in the electronic apparatus.

According to the present invention, there is proposed a method for adjusting an executing efficiency adapted in an electronic apparatus, wherein the electronic apparatus has a central processing unit (CPU). The method includes steps of obtaining a loading value by detecting the CPU under the electronic apparatus operation and adjusting a working voltage of the CPU corresponding to the loading value for achieving adjustment of the executing efficiency in the electronic apparatus.

Certainly, the electronic apparatus can be a personal computer or a notebook. Preferably, the method further includes step of adjusting the working voltage of a chip set in the personal computer corresponding to the loading value for achieving adjustment of the executing efficiency in the electronic apparatus.

According to the present invention, there is proposed a device for adjusting an executing efficiency adapted in an electronic apparatus, wherein the electronic apparatus has a central processing unit (CPU). The device includes a reader for reading a loading value by detecting the CPU under the electronic apparatus operation, and a regulator electrically connected to the reader for adjusting a working voltage of the CPU corresponding to the loading value for achieving adjustment of the executing efficiency in the electronic apparatus.

According to the present invention, there is proposed a method for adjusting an executing efficiency adapted in an electronic apparatus. The method includes steps of detecting a loading value under the electronic apparatus operation, and adjusting an executing efficiency of the electronic apparatus corresponding to the loading value.

Certainly, the electronic apparatus can be a personal computer or a notebook. Preferably, the adjusting steps includes steps of adjusting working frequencies of a central processing unit (CPU), a memory circuit, an accelerated graphics port (AGP) and a peripheral component interconnect (PCI) of the personal computer, and adjusting working voltages of and the CPU and a chip set.

According to the present invention, there is proposed a device for adjusting an executing efficiency, adapted in an electronic apparatus. The device includes a reader for reading a loading value under the electronic apparatus operation, and a regulator electrically connected to the reader for adjusting the executing efficiency in the electronic apparatus corresponding to the loading value.

The present invention may best be understood through the following description with reference to the accompanying drawings, in which:

DETAILED DESCRIPTION OF THE PREFERRED EMBODIMENTS

Figure 1:
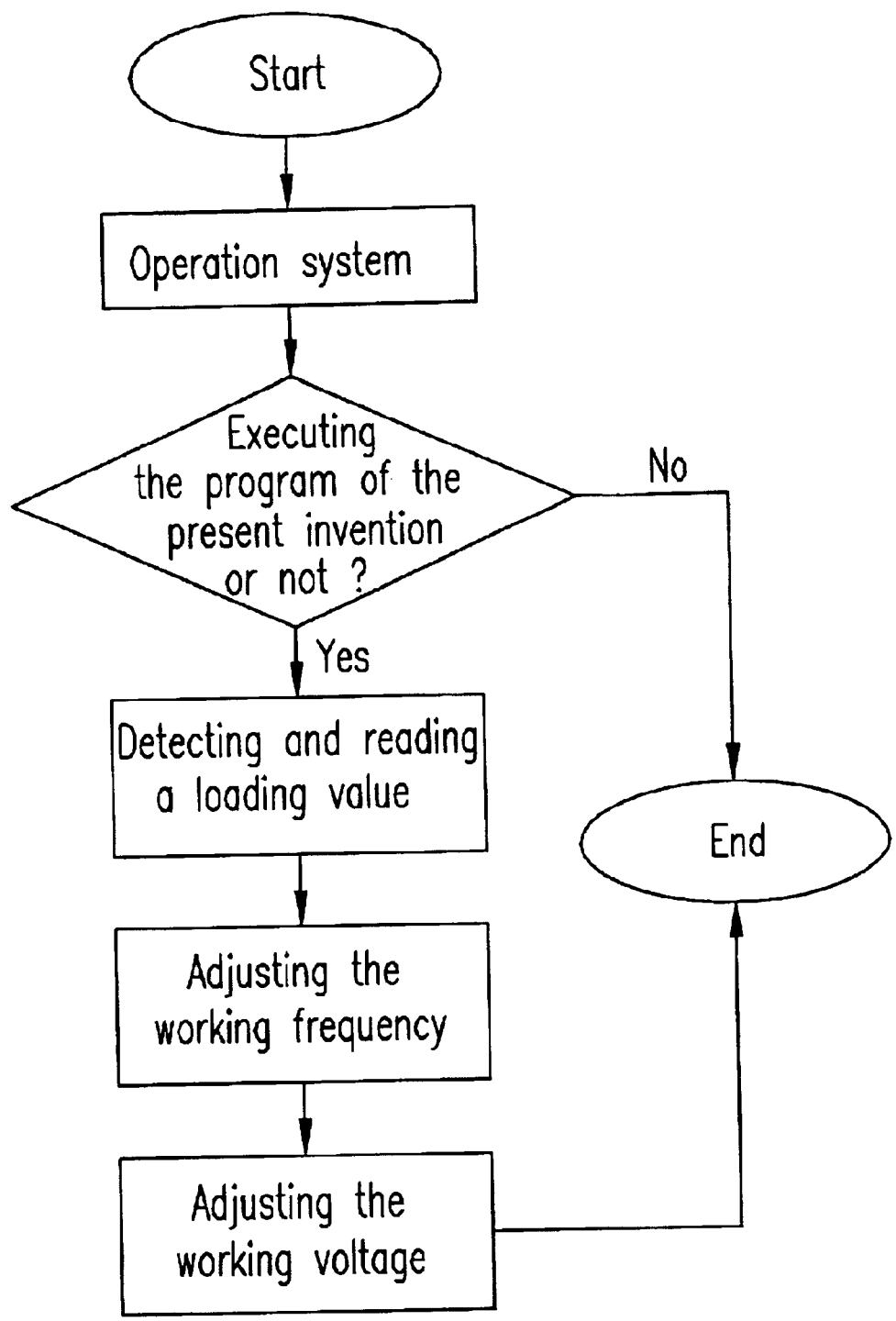
FIG. 1 is a flow chart illustrating windows of executing Regedit.ext under Windows.

As shown in FIG. 1, a portable personal computer is used as an example. First, after turning on the personal computer, the computer system enters an operation system (OS). When a program according to a preferred embodiment of the present invention is executed, the operation system will automatically read the central processing unit (CPU) to detect and obtain a loading value. Sequentially, the operation system will adjust a working frequency and a working voltage of the CPU corresponding to the loading value for achieving executing efficiency adjustment of the personal computer.

Figure 2A:
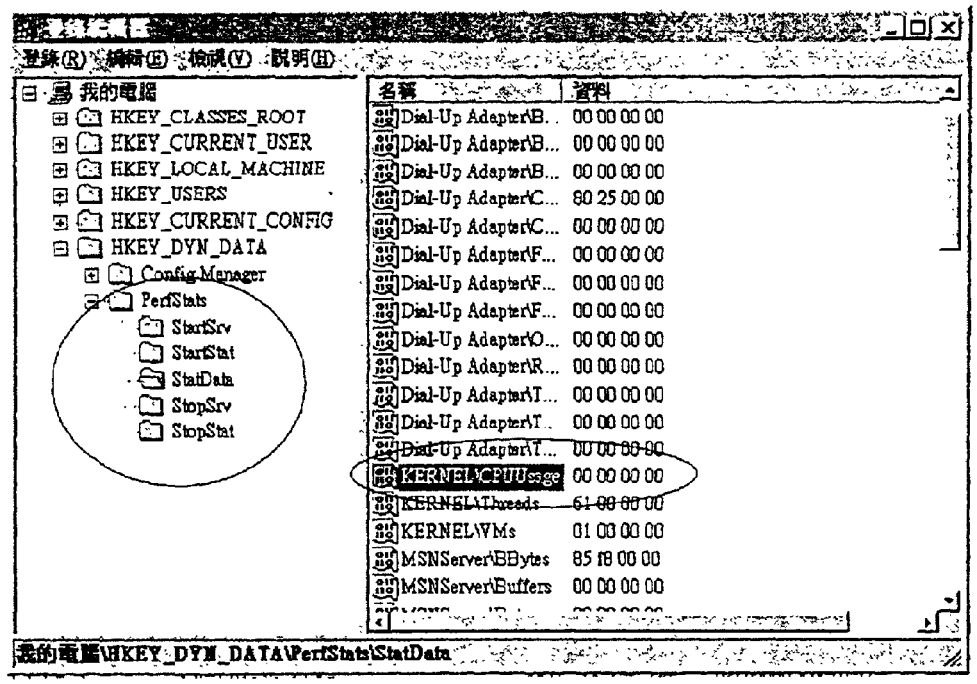
FIGS. 2A–2B are diagrams illustrating windows of executing Regedit.ext under Windows.
Figure 2B:
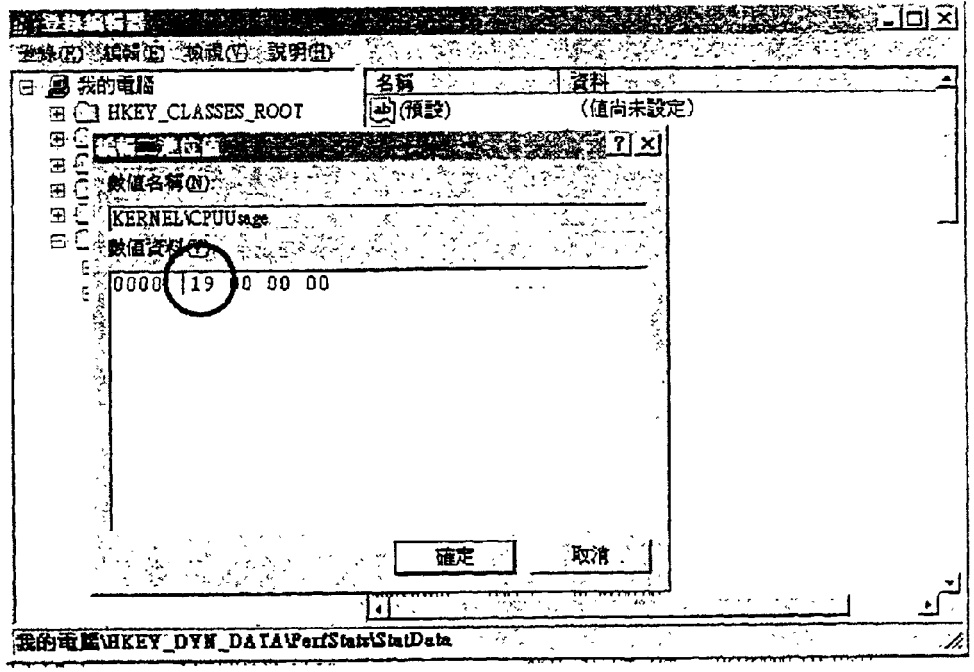

For the most popular operating system, Windows from Microsoft, the operating system of Windows provides an executive file of Regedit.exe to detect the loading value of CPU. Thus, when the portable personal computer is working, the program of the present invention will automatically execute the Regedit.exe, and read the loading value which is transmitted back by the Regedit.exe. As shown in FIG. 2A, the Regedit.exe is under Windows contents. When the Regedit.exe is executed, each value of the system loading can be obtained. CPUUsage shown in FIG. 2A is the loading condition of CPU. When entering CPUUsage, a window as shown in FIG. 2B will be showed. The second number "19" shown in the window represents that the current loading value of CPU is 19%. Then, the program of the present invention can use this loading value as a parameter to return to the program for deciding to change the working frequency and working voltage or not.

Figure 3:
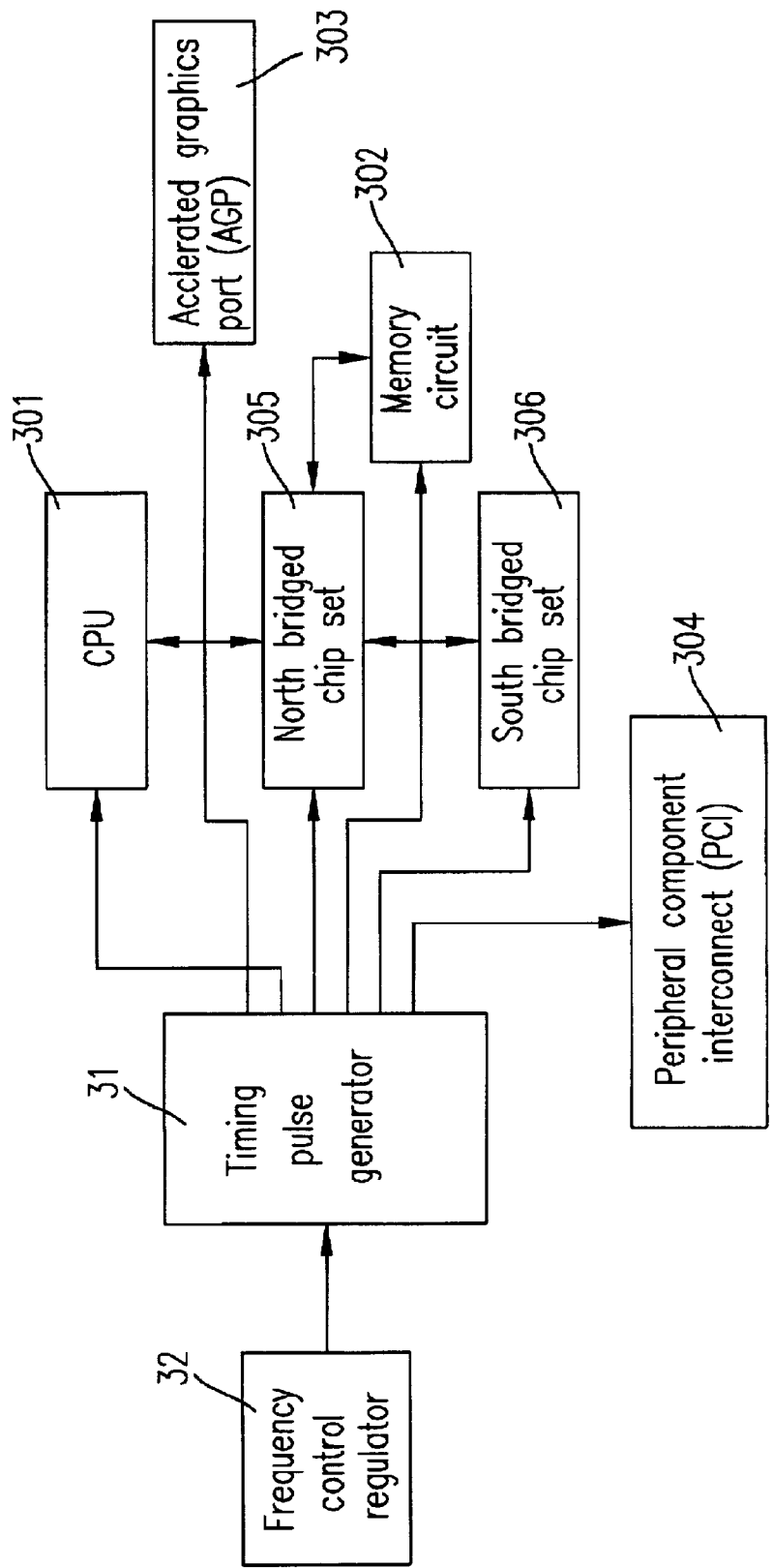
FIG. 3 is a block diagram illustrating a timing pulse generator provides timing pulse signals to different circuits in a personal computer.

As shown in FIG. 3, a timing pulse generator 31 provides required timing pulse signals for a central processing unit (CPU) 301, memory circuit 302, an accelerated graphics port (AGP), a peripheral component interconnect (PCI), a North bridged chip set 305 and a South bridged chip set 306. A front side BUS frequency signal generated by the timing pulse generator 31 is become a treating speed after frequency multiplication of each circuit. For example, a front side BUS frequency of 133.3 MHz is generated by the timing pulse generator 31. After the six multiple frequency treatment in the CPU 301, the 133.3 MHz is become to a treating speed of 800 MHz. Hence, according to a preferred embodiment of the present invention, when a frequency control modulator 32 is used in changing the front side BUS frequency generated by the timing pulse generator 31, the treating speed inside each circuit can be changed. Thus, after detecting a loading value, the frequency control modulator 32 further changes a value stored in a register 32 which is inside the timing pulse generator 31 and is used for defining a front side BUS frequency generated by the timing pulse generator 31, and the adjustment of the front side BUS frequency can be achieved. However, the function of the frequency control modulator 32 can be achieved by hardware, software or the combination according to particular demand.

Figure 4:
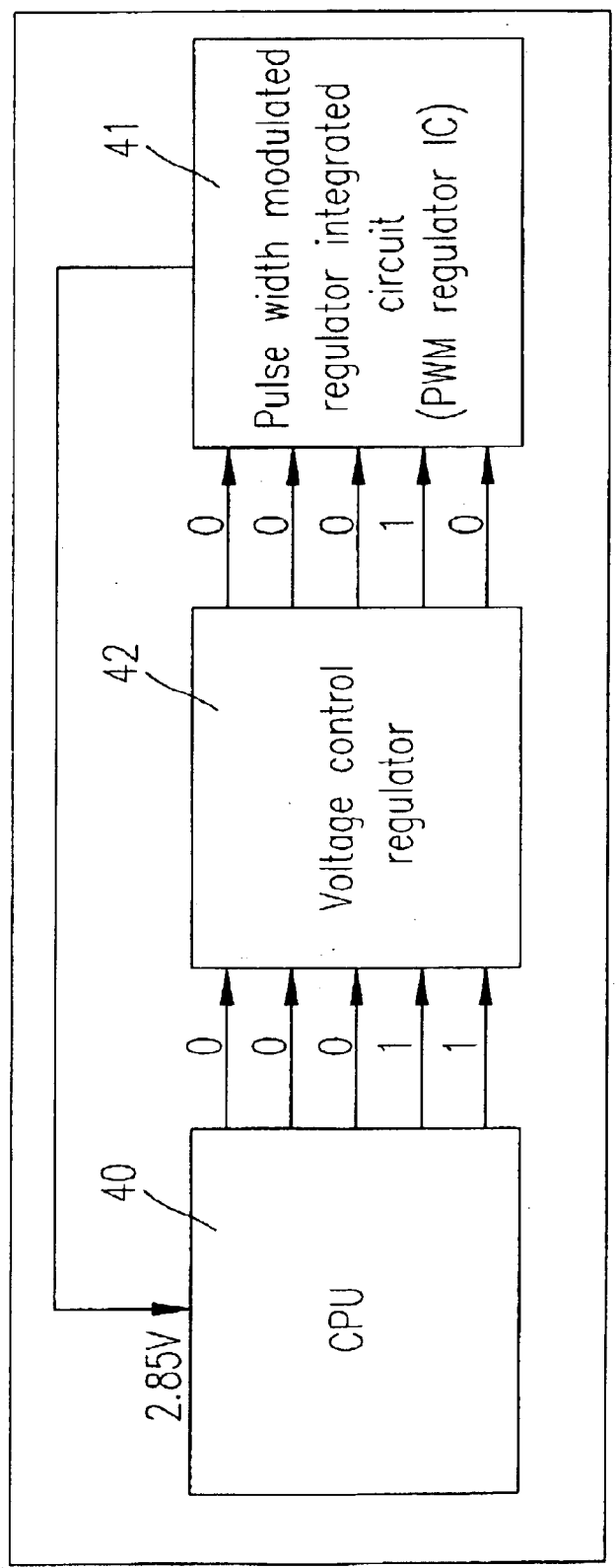
FIG. 4 is a block diagram illustrating a device of adjusting an executing efficiency for controlling a working voltage of a central processing unit (CPU) according to the present invention.

FIG. 4 is a block diagram illustrating a device of adjusting an executing efficiency for controlling a working voltage of a central processing unit (CPU) according to the present invention. As shown in FIG. 4, a pulse width modulated regulator IC 41 (PWM regulator IC) is used for receiving a 5-bit parallel digital signal such as "00011" generated by a voltage identification pin of the CPU 40 to control and generate a working voltage such as "2.8V" required for the CPU 40. Hence, a voltage control regulator 42 inserted between the PWM regulator IC 41 and the CPU 40 according to the present invention is used for interdicting the signal of "00011" and outputting another 5-bit parallel digital signal such as "00010" according to a loading value of the system at that time. Therefore, the PWM regulator IC 41 is able to generate a proper working voltage such as "2.85V" according to the system loading at that time. However, the function of the voltage control regulator 42 can be achieved by hardware, software or the combination according to particular demand.

Figure 5A:
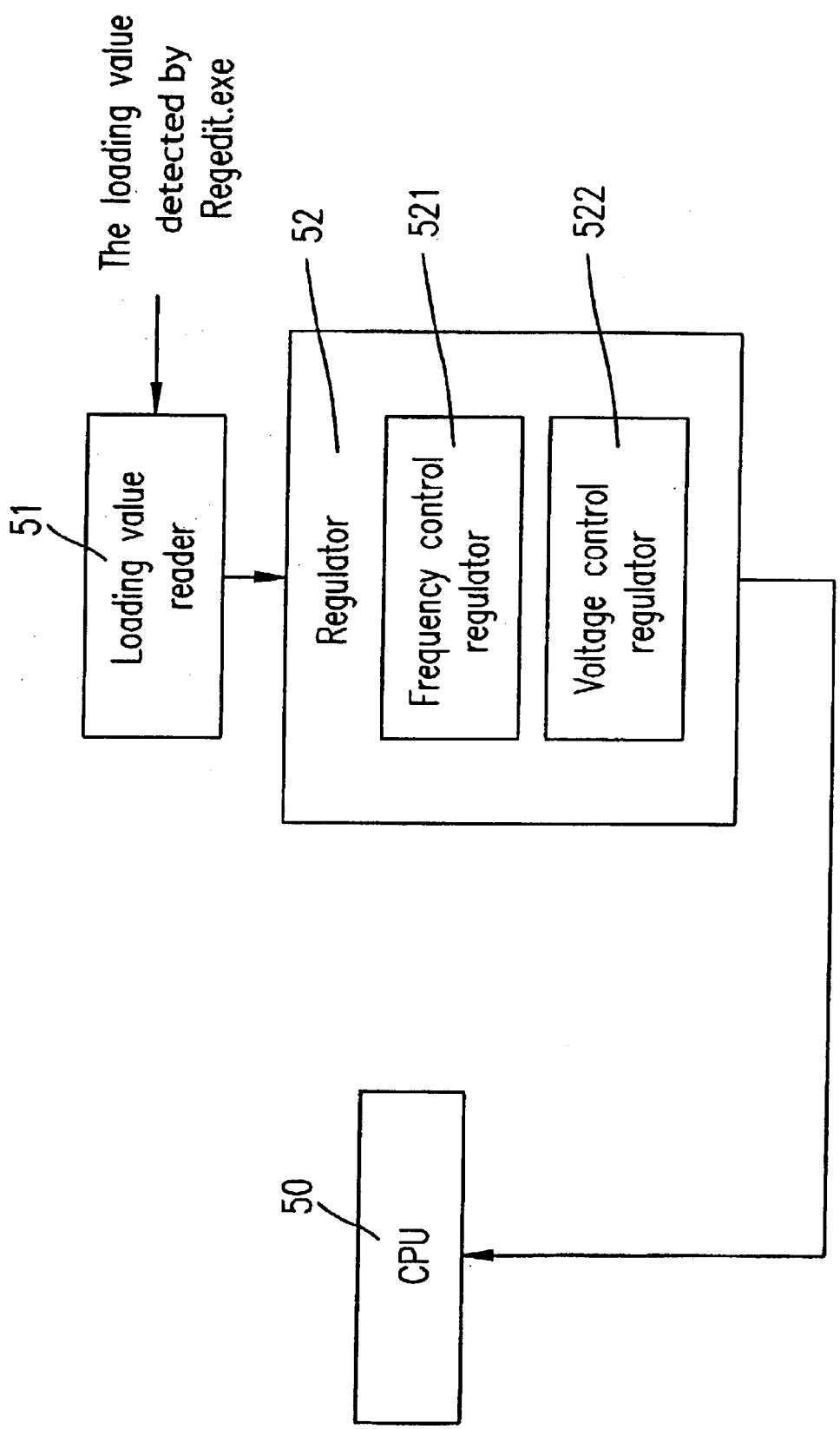
FIG. 5A is a block diagram illustrating a device of adjusting an executing efficiency according to a preferred embodiment of the present invention.

Accordingly, for the portable personal computer, the detecting action of the loading value in the CPU can be achieved by the Regedit.exe provided by Windows operation system. As shown in FIG. 5A, when the loading value of the CPU 50 is detected by executing the Regedit.exe, the loading value is read by a loading value reader 51 and is transmitted to a regulator 52, which is principally composed of a frequency control regulator 521 and a voltage control regulator 522, for judging. Therefore, according to the obtained loading value and the corresponded working frequency and working voltage, a table can be constructed. Using this table, the working frequency and the working voltage can be adjusted according to different loading value of CPU, so the executing efficiency adjustment of the portable personal computer can be further achieved. In addition, the function of the loading value reader 51, the frequency control regulator 521 and voltage control regulator 522 can be achieved by hardware, software or the combination according to particular demand.

Figure 5B:
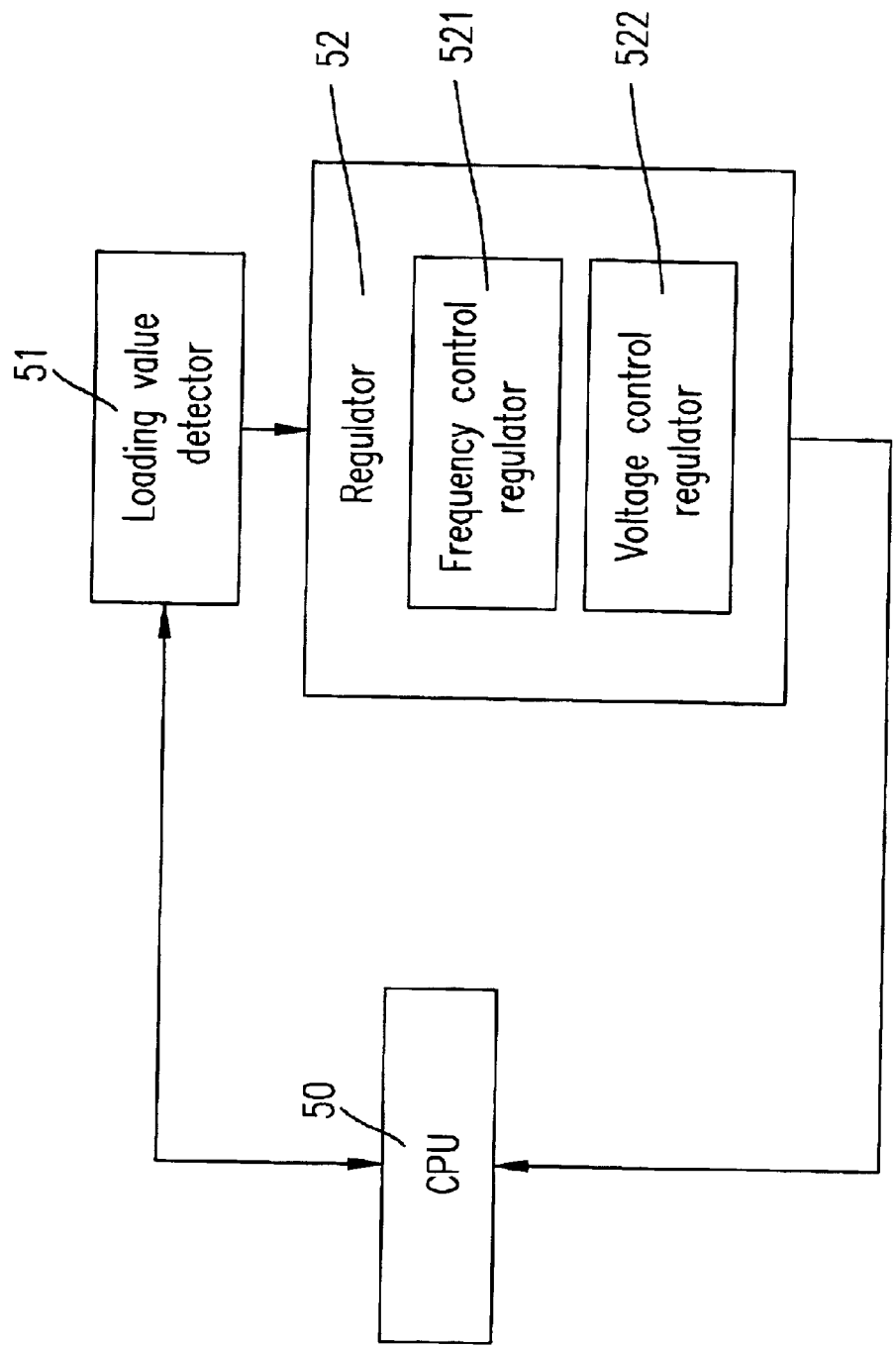
FIG. 5B is a block diagram illustrating a device of adjusting an executing efficiency according to another preferred embodiment of the present invention.

As shown in FIG. 5B, the Regedit.exe provided by Windows operation system is replaced by a loading value detector 53. Thus, the loading value of CPU 50 is detected by the loading value detector 53 for obtaining the loading value of CPU 50. Sequentially, the working frequency and the working voltage are adjusted corresponding to the loading value of CPU 50 by the regulator 52 including the frequency control regulator 521 and the voltage control regulator 522. Therefore, the executing efficiency adjustment of the portable personal computer is further achieved.

Besides the adjustment of the working frequency and the working voltage in the CPU, the adjustment method or the regulator 52 according to the present invention also can adjust the working frequencies of the memory circuit 302, the accelerated graphics port (AGP) and the peripheral component interconnect (PCI), and the working voltages of the chip set including the North bridged chip set 305 and South bridged chip set 306. Therefore, the executing efficiency adjustment of the portable personal computer also can be achieved.

In addition, the present invention can be also applied in a various information electronic products, such as the personal digital assistant and set-top box besides the personal computer.

In sum, when the method or device for adjusting executing efficiency according to the present invention is applied in a various of information electronic products, the executing efficiency can be adjusted corresponding to the change of the loading value in the system and the software with different degrees of complication can be dealt with different executing speeds. That is, because the system mostly deals with the simple program, the system loading is lighter than prior art. Therefore, the lower working frequency and the lower working voltage can save whole resource, reduce power-consumption, and increase the use life of the electronic product.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting and executing efficiency adapted in an electronic apparatus, wherein said electronic apparatus has a central processing unit (CPU) and uses an operating system to manage data, comprising steps of:
    obtaining a loading value when said operating system is executed to detect said CPU under said electronic apparatus operation; and
    adjusting a working frequency and a working voltage of said CPU corresponding to said loading value for achieving adjustment of said executing efficiency in said electronic apparatus;
    wherein said step of adjusting said working frequency of said CPU comprises steps of:
        changing a value of a register in a timing pulse generator corresponding to said loading value; and
        changing a front side BUS frequency outputted from said timing pulse generator to said CPU corresponding to said value of said register change; and
    said step of adjusting said working voltage of said CPU comprises steps of:
        receiving a first voltage signal outputted from a voltage identification (ID) pin of said CPU to a voltage control regulator;
        outputting a second voltage signal according to said loading value from said voltage control regulator to a pulse width modulated regulator corresponding to said first voltage signal interdicted by said voltage control regulator; and
        changing said working voltage of said CPU in respond to said second voltage signal outputted from said pulse width modulated regulator to said CPU corresponding to said loading value and said first voltage signal.

2. The method according to claim 1, wherein said operating system is a WINDOWS operating system selected from a group of WINDOWS 95, WINDOWS 98 and WINDOWS Me for providing a file regedit.exe to be executed for detecting said CPU to obtain said loading value during said electronic apparatus being one of a personal computer and a notebook operating.

3. The method according to claim 1, further comprising steps of adjusting working frequencies of a memory circuit, an accelerated graphics port (AGP), and a peripheral component interconnect (PCI), and a working voltage of a chip set for achieving adjustment of said executing efficiency in said electronic apparatus.

4. A device for adjusting an executing efficiency adapted in an electronic apparatus, wherein said electronic apparatus has a central processing unit (CPU), comprising:
    a reader for reading a loading value by detecting said CPU under said electronic apparatus operation;
    a control regulator electrically connected to said reader and said CPU for interdicting a first voltage signal outputted from said CPU and changing said first voltage signal to a second voltage signal corresponding to said loading value; and a regulator electrically connected to said control regulator and said CPU for adjusting a working voltage of said CPU corresponding to said loading value for achieving adjustment of said executing efficiency in said electronic apparatus.

* * * * *